United States Patent
Szabo et al.

[11] 3,812,350
[45] May 21, 1974

[54] NOVEL ICI CORRECTED PHOTOTRANSDUCER FOR MEASURING LIGHT OUTPUT OF PHOTOFLASH ITEMS

[75] Inventors: Louis R. Szabo, Landing; Martin Lazarus, Dover, both of N.J.

[73] Assignee: The United States of America as represented by the Secretary of the Army, Washington, D.C.

[22] Filed: Aug. 8, 1972

[21] Appl. No.: 278,837

[52] U.S. Cl. ................. 250/226, 350/313, 356/176
[51] Int. Cl. .............................................. G01j 3/34
[58] Field of Search ............ 250/226; 356/176, 177; 350/313, 316

[56] References Cited
UNITED STATES PATENTS

| | | | |
|---|---|---|---|
| 2,483,452 | 10/1949 | Berkley | 356/176 |
| 2,656,099 | 10/1953 | Selling | 356/176 X |
| 2,708,389 | 5/1955 | Kavanagh | 350/316 X |
| 3,506,364 | 4/1970 | Shurgan et al. | 250/226 X |

*Primary Examiner*—Walter Stolwein
*Attorney, Agent, or Firm*—Edward J. Kelly; Herbert Berl; Victor Erkkila

[57] ABSTRACT

A phototransducer has a silicon photovoltaic cell corrected with two glass filters to the standard ICI spectral response equivalent to the spectral response of the human eye. Also, a method for correcting variations in the manufacture of the glass filters to adjust the filter to the thickness required for ICI correction of the silicon photocell.

1 Claim, 6 Drawing Figures

3,812,350

NOVEL ICI CORRECTED PHOTOTRANSDUCER FOR MEASURING LIGHT OUTPUT OF PHOTOFLASH ITEMS

GOVERNMENT INTEREST

The invention described herein may be manufactured, used and licensed by or for the Government for governmental purposes without the payment to me of any royalty thereon.

BACKGROUND OF THE INVENTION

The present invention relates to an improved phototransducer having suitable ICI (human eye) spectral response and sufficiently rapid rise time characteristics for measurement of the light output of military photoflash items.

The proper exposure of a film emulsion depends on the quanity of light it receives, which in turn is determined by the time integral of the luminous flux that can be expressed in candleseconds. Specifications on military photoflash items, as used in aerial photography, are given in terms of total light (candleseconds) for a duration of 40 milliseconds.

The measurement of the light characteristics of military photoflash items has always hampered by the lack of a phototransducer with suitable ICI (human eye) spectral response and/or sufficiently rapid rise time characteristics. By definition, the measurement of light which utilizes engineering units such as candela; footcandles, etc. infers the use of a photocell closely matching a spectral curve, which has been accepted as a standard human eye response by the International Commission of Illumination (ICI). This establishes the first requirement for a photoflash transducer. The second requirement for the photoflash transducer must be a rapid rise time, since the typical photoflash rises to peak in approximately 1 to 2 seconds.

In the past, various types of photocells, such as photoemissive and photovoltaic, have been used in photoflash work with varying degrees of success. However, experience has shown that photocells which could be adequately ICI corrected did not possess suitable rise time characteristics or the converse. At present, the 929 photoemissive vacuum tube, which has S4 response, is being used, although its correction to the human eye (ICI) response is poor and it requires a power supply which degrades its stability. The 856 Weston selenium photovoltaic sensor, which possesses an acceptable ICI correction, was considered for measuring short duration light pulses, but its slow response time precludes its use for this application.

Thus, prior to the present invention, there was no phototransducer known, which combined adequate ICI correction and fast rise time so as to permit accurate measurement of the light output of military photoflash items.

SUMMARY OF THE INVENTION

In accordance with this invention, a phototransducer is provided, which possesses an accurate and reproducible ICI correction, fast rise time, long term stability, low temperature coefficient, high sensitivity and long shelf life.

More particularly, the invention provides a novel phototransducer, which consists essentially of a silicon photovoltaic cell with two filters, whose combined transmission characteristics in the visible portion of the spectrum correct the silicon cell response essentially to the standard ICI (human eye) response. Specifically, the invention provides a phototransducer of the aforesaid type wherein the corrective filter system consists of two colored glass filters, the first filter having the following spectral transmission characteristics:

80 percent transmission at 550 mu (millimicrons)
35 percent transmission at 500 mu
10 percent transmission at 450 mu
1 percent transmission at 400 mu and the second filter having the following spectral transmission characteristics:

80 percent transmission at 550 mu (millimicrons)
39 percent transmission at 600 mu
6 percent transmission at 650 mu
1 percent transmission at 700 mu The invention also provides a method whereby variations in such filters, as produced by the manufacturer, can be corrected so as to obtain a filter having the required thickness to provide the desired ICI correction of the silicon photocell.

DETAILED DESCRIPTION OF INVENTION

A true candlepower transducer is a photoelectric device which converts light energy to electrical current linearly following a specific attenuation function or spectral response throughout the visible spectrum. This function is that of an average human eye and is called the ICI response or $\bar{y} \lambda$ function, shown in FIG. 1. The transducer must be linear in that an increased amount of light energy at any given wavelength will result in a proportionally increased current output from the cell.

Since no photodetector with the spectral luminous efficiency of ICI response exists, correction is required. This is accomplished by applying filters to force the detector's response to the desired ICI response.

THE SILICON PHOTOVOLTAIC CELL

The silicon cell employed in the present invention is well known. It is a p-n junction semiconductor, also called barrier layer cell, since there is a potential barrier at the junction. The incident light produces electron-hole pairs, the hole diffusing to the junction, thereby producing current.

Figure 1:
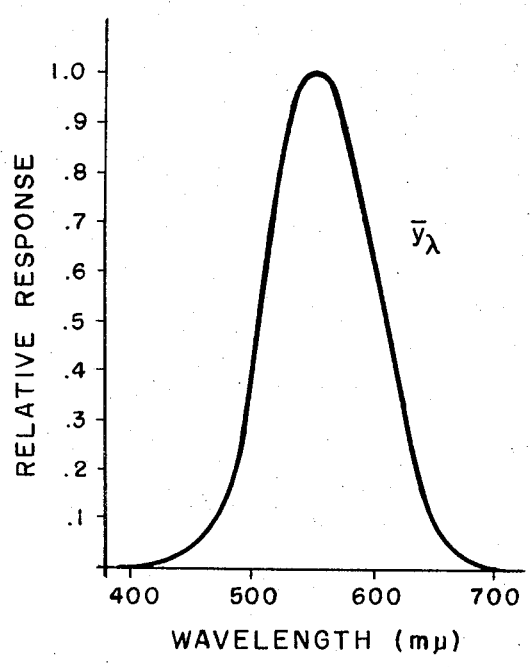
FIG. 1 shows the spectral transmission curve corresponding to the relative spectral response of the human eye, also called the ICI response or $\bar{y} \lambda$ function.
Figure 2:
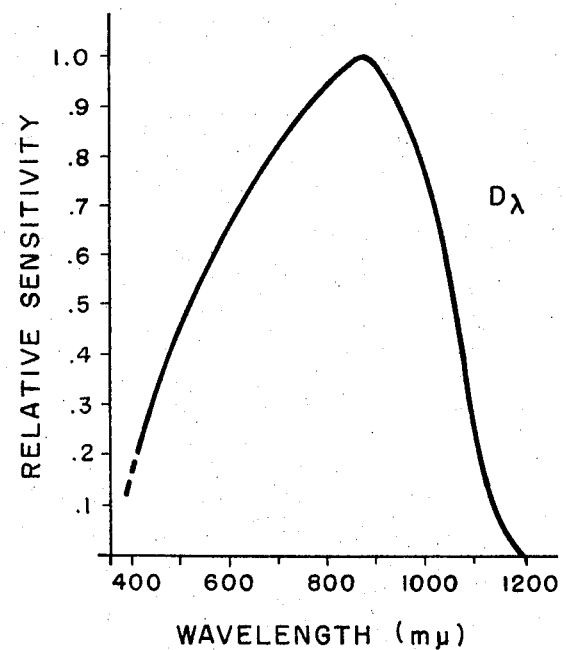
FIG. 2 sets forth the curve showing a typical relative spectral response of a silicon photovoltaic cell.

The spectral response of the silicon barrier layer cell is shown in FIG. 2. Its quantum efficiency at the shorter wavelengths (violet and blue region) is relatively low; however, this does not constitute a handicap, since the response in this region of the human eye is even lower as indicated in FIG. 1. The efficiency peaks at 960 mm and goes to zero at about 1,100 mm.

The spectral efficiency curves of these items show only slight variations, and for all practical purposes they can be considered uniform.

The low time constant or rise time of the silicon layer cell is also a great improvement over the selenium cell. The rise time of selenium at illumination levels of one footcandle or higher is approximately 5 milliseconds. At lower light levels the rise time increases, however, to several minutes, and for the optical measurement of low light levels, or short duration photoflash items, the selenium barrier layer cell is useless.

The silicon cell has a time constant on the order of a few microseconds. It therefore suits photoflash items which have rise times on the order of one millisecond.

THE SILICON PHOTOVOLTAIC CELL CORRECTED TO ICI RESPONSE

Figure 3:
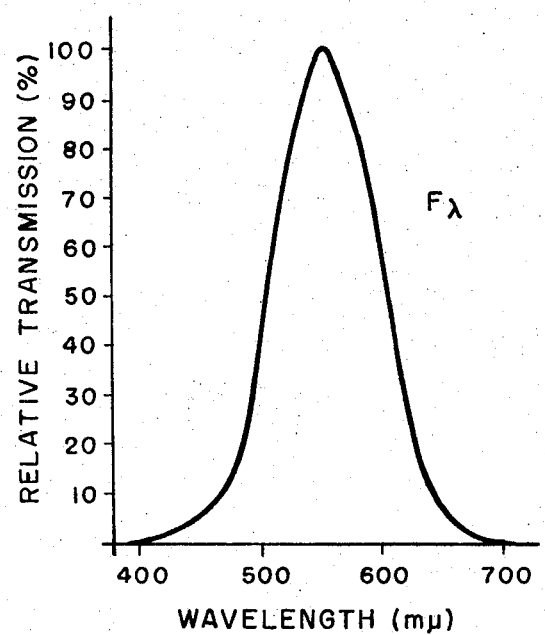
FIG. 3 shows the relative transmission curve or function of the ideal ICI correction filter for the silicon cell.

The relative transmission function of the ideal (ICI) correction filter for the silicon cell is shown by the curve in FIG. 3 and can be resolved from the equation $$F_\lambda = \bar{y}_\lambda / D_\lambda$$

where $F_\lambda$ is the relative transmission function of the corrective filter, $\bar{y}_\lambda$ is the ICI or human eye response and $D_\lambda$ is the relative spectral efficiency of the silicon photocell.

It was found that no single filter could match $F_\lambda$.

Figure 4:
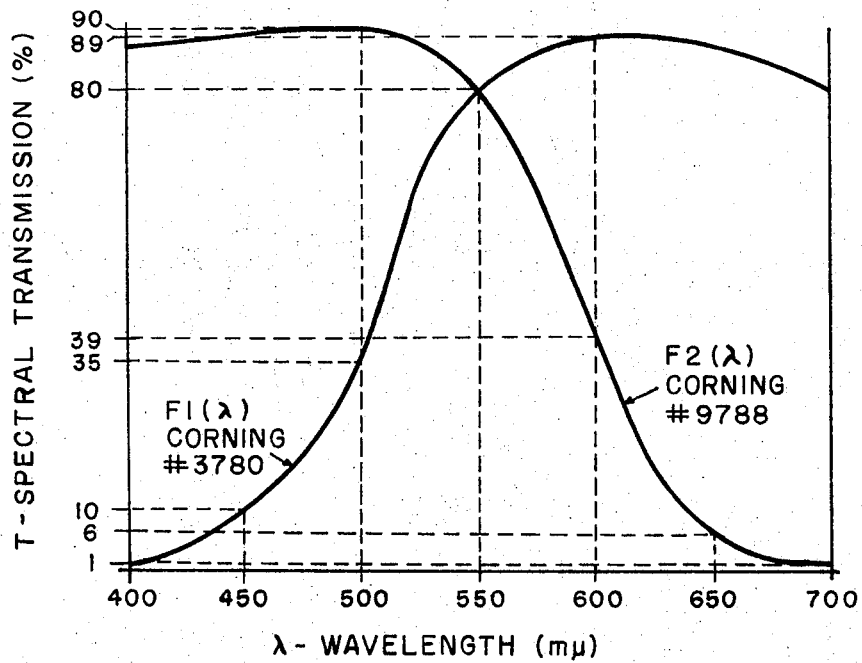
FIG. 4 shows the spectral transmission curves of Corning Glass Filters 3780 and 9788.

According to the present invention, the correction of the silicon cell to the standard ICI (human eye) response has been accomplished by means of two colored glass filters having the spectral characteristics noted below and shown by the curves in FIG. 4. Suitable filters are Corning Glass Color Filters Nos. 3780 and 9788, manufactured by the Corning Glass Works, Corning, New York.

| FIRST FILTER | SECOND FILTER |
| --- | --- |
| 80% transmission at 550 mu | 80% transmission at 550 mu |
| 35% transmission at 500 mu | 39% transmission at 600 mu |
| 10% transmission at 450 mu | 6% transmission at 650 mu |
| 1% transmission at 400 mu | 1% transmission at 700 mu |

The combined transmission characteristics of these filters in the visible portion of the spectrum corrects the silicon cell response to the desired ICI response. This correction is unique to the silicon photovoltaic cell, since the response of any other photocell, such as a selenium photovoltaic cell, is not equal to P ($\lambda$) in the following equation:

$$\bar{Y}(\lambda) = \int_0^\infty P(\lambda) \cdot F_1(\lambda) \cdot F_2(\lambda) d\lambda$$

where
$Y(\lambda)$ = ICI (Human Eye) Response
$P(\lambda)$ = Silicon Photovoltaic Cell Response
$F_1(\lambda)$ = Transmission Characteristic of Filter 1
$F_2(\lambda)$ = Transmission Characteristic of Filter 2
$\lambda$ = Wavelength

METHOD FOR CORRECTING VARIATIONS IN PRODUCTION GLASS MELTS
TO PRODUCE A FILTER POSSESSING THE REQUIRED SPECTRAL
TRANSMISSION FOR PRECISE ICI CORRECTION OF THE SILICON
PHOTOCELL

The transmission characteristics of the filters may vary from melt to melt each time a batch of colored filter glass is produced by the manufacturer. Thus, for example, Corning Glass Filter 9788 is a special filter, whose characteristics cannot be as closely controlled as those of other glass filters, so that at the standard 5 mm. thickness of this filter, as supplied by the manufacturer, the spectral transmission characteristics of various melts can vary widely. However, in general, compensation can be readily obtained by calculating the required thickness of the filter in the manner described below, and then grinding the glass to the required thickness.

Thus, the logarithmic equation for computing transmission changes resulting from changing the glass thickness is as follows:

$$T\lambda = K 10^{116 \, B\lambda \, t} \tag{1}$$

$$B\lambda = \log K - \log T\lambda / t \tag{2}$$

$$\bar{t} = \log K - \log T\lambda / B\lambda \tag{3}$$

where
$T\lambda$ is the transmission of the filter at the particular wavelength
K is the surface reflectance factor and given as 0.9216
$t$ is the thickness of the glass filter as supplied
$\bar{t}$ is the desired thickness of the glass filter
$B\lambda$ is the glass index of the particular melt at the particular wavelength.

(Any measuring unit may be used, but its use must be consistent throughout the computation.)

Figure 5:
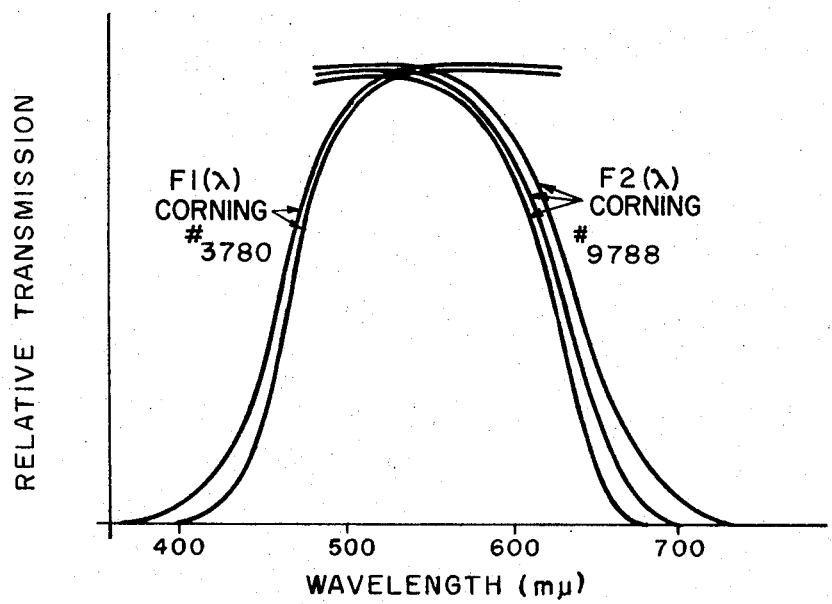
FIG. 5 shows transmission curves of Corning Glass Filters 3780 and 9788 of varying glass thickness.

Equation (1) is very valuable for generating a family of transmission curves as a function of glass thickness as shown in FIG. 5. The calculating procedure is as follows:

Given: The spectral transmission curve for the filter in question at the known thickness.

1. Compute $B\lambda$ for wavelengths which are of interest, using Equation (2).
2. Compute the transmissions for different thicknesses or the thickness for the desired transmission, using Equations 1 and 3, respectively, as desired.

Using Equations (1), (2) and (3), approximately 50 different melts of 9788 filters were analyzed in the foregoing manner. It was found possible to match the red cutoff portion of ideal response curve $F\lambda$ (FIG. 3), if each of the melts was grounded to a specific critical thickness determined in the aforesaid manner (which in these melts varied from 3.1 to 6.1 mm. thickness)

The left or blue cutoff portion of the curve was essentially matched by Filter 3780 at 1.2 mm thickness.

Figure 6:
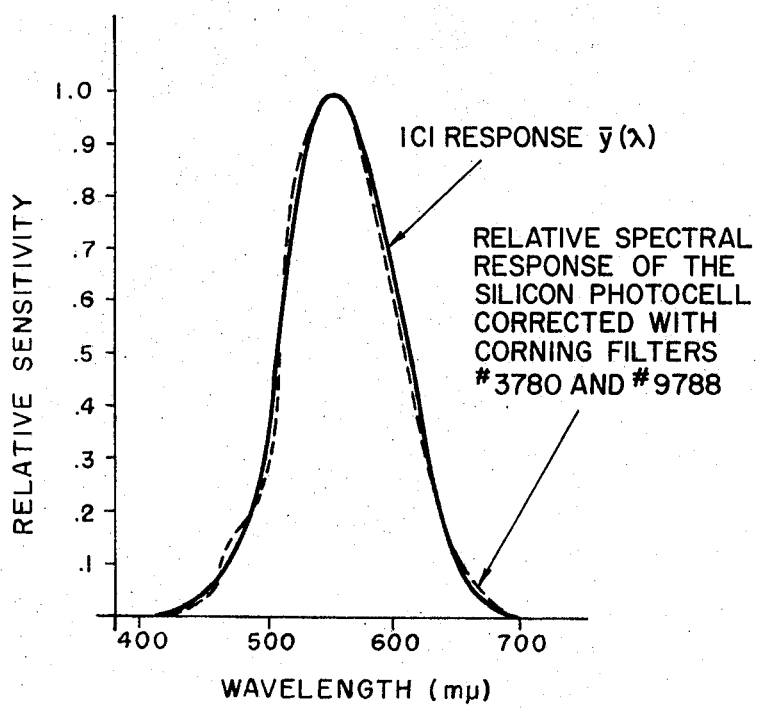
FIG. 6 sets forth the relative spectral response of the silicon photocell corrected with Corning Glass Filters 3780 and 9788 vs. the ideal $\bar{y} \lambda$ function or ICI response.

The combined (corrected) spectral response of the silicon photovoltaic cell and colored glass filters 3780 and 9788 is shown as a broken line curve in FIG. 6 together with the ICI or human eye response solid line curve for comparison.

It is thus evident that the invention represents an important technical advance in the art of measuring the light output of photoflash items by providing a novel phototransducer possessing the desired ICI (human eye) response and sufficiently fast rise time characteristics, said transducer consisting essentially of a silicon photovoltaic cell corrected to ICI response with suitable glass filters; and also by providing a method for correcting for variations in production items of glass filters so as to produce a filter having the required spectral transmission for the ICI correction of the silicon phtocell.

We wish it to be understood that we do not desire to be limited to the exact method and detail of construction described for obvious modification will occur to persons skilled in the art.

We claim:

1. A phototransducer consisting essentially of a silicon photovoltaic cell in combination with two colored glass filters together possessing transmission characteristics in the visible portion of the spectrum sufficient to correct said silicon cell response essentially to the spectral transmission curve corresponding to the relative spectral response of the human eye, wherein one of said filters possesses the following spectral transmission;

80 percent at 550 mu
35 percent at 500 mu
10 percent at 450 mu
1 percent at 400 mu and the other of said filters possesses the following spectral transmission:

80 percent at 550 mu
39 percent at 600 mu
6 percent at 650 mu
1 percent at 700 mu.

* * * * *